United States Patent [19]
Hashinoki et al.

[11] Patent Number: 4,800,757
[45] Date of Patent: Jan. 31, 1989

[54] ULTRASONIC DIMENSION MEASURING APPARATUS

[75] Inventors: Kazuhiro Hashinoki; Kenichi Dairiki, both of Kanagawa, Japan

[73] Assignee: Mitsubishi Denki Kabushiki Kaisha, Tokyo, Japan

[21] Appl. No.: 928,907

[22] Filed: Nov. 7, 1986

[30] Foreign Application Priority Data

Nov. 15, 1985 [JP] Japan .................................. 60-255985
Dec. 2, 1985 [JP] Japan .................................. 60-270946

[51] Int. Cl.⁴ ........................................... G01N 29/00
[52] U.S. Cl. ..................................................... 73/597
[58] Field of Search ......................... 73/597, 611, 634; 367/99; 340/674, 675

[56] References Cited

U.S. PATENT DOCUMENTS

| | | | |
|---|---|---|---|
| 3,603,680 | 12/1969 | Barton | 355/3 |
| 3,844,163 | 10/1974 | DiLeo | 73/597 |
| 4,368,438 | 1/1983 | Stinestra | 73/159 |
| 4,594,897 | 6/1986 | Bartz | 73/644 |

OTHER PUBLICATIONS

J. B. Beyer, et al., "Microwave Thickness Detector", Rev. of Sci. Inst., Mar. 1960, vol. 31, No. 3, pp. 313-316.

Primary Examiner—Stewart J. Levy
Assistant Examiner—Lawrence G. Fess
Attorney, Agent, or Firm—Wolf, Greenfield & Sacks

[57] ABSTRACT

An apparatus for measuring a dimension of an object by using ultrasonic waves includes: a pair of probes spaced apart one of the probes being to face a top surface of the object and the other of the probes being to face a bottom surface of the object; control for choosing what to be currently measured from three kinds of travelling periods of time which ultrasonic pulses take: to propagate between the probes; to travel between the top surface of the object and the probe facing the top surface; and to travel between the bottom surface of the object and the other probe facing the bottom surface and apparatus responsive to the transmission and reception signals for evaluating the three kinds of travelling periods of time and for calculating the dimension of the object from the evaluated travelling periods, whereby the probes can be out of touch with the surfaces of the object. Additionally the apparatus includes a monitor to determine whether a test object is present between the probes to start the control system.

14 Claims, 8 Drawing Sheets

| CASE \ SWITCH NO. | $S_1$ | $S_2$ | $S_3$ | |
|---|---|---|---|---|
| 1 | C | O | C | C: CLOSED |
| 2 | C | C | O | O: OPENED |
| 3 | O | C | C | |

Fig. 5
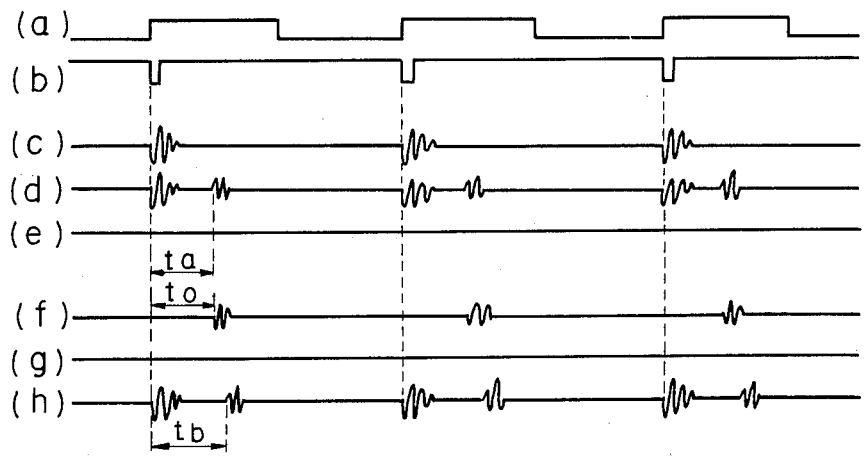
Fig. 6
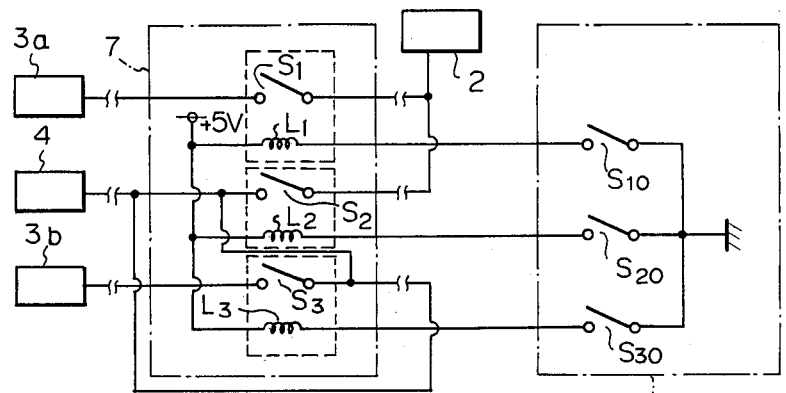
Fig. 7
| CASE \ SWITCH NO. | S10 | S20 | S30 | |
|---|---|---|---|---|
| 1 | C | O | C | C: CLOSED |
| 2 | C | C | O | O: OPENED |
| 3 | O | C | C | |

ULTRASONIC DIMENSION MEASURING APPARATUS

FIELD OF THE INVENTION

The present invention generally relates to an apparatus for measuring a dimension of an object by using ultrasonic waves and more particularly to an ultrasonic thickness or distance measuring apparatus which can measure a thickness and so on of an object with its probes being out of touch with the object.

DESCRIPTION OF PRIOR ART

A typical means for measuring a dimension of an object of measurement such as a material object made of solid matter (for example, metal) by using ultrasonic waves is an ultrasonic thickness meter or distance meter which emits ultrasonic waves into the object and receives the ultrasonic waves reflected from the back of the object (hereunder sometimes referred to simply as echoes) in order to measure thickness of the object.

Hitherto, among such apparatus, an ultrasonic thickness meter as shown in FIG. 1 has been proposed. In this figure, reference numerals 1, 2, 3, 4, 5 and 6 designated: a synchronizing portion for generating synchronizing signals; a transmitting portion being responsive to the synchronizing signals of the synchronizing portion 1 for producing transmission signals; a probe for generating ultrasonic waves in response to the transmission signal from the transmitting portion, sending out the generated waves (hereafter sometimes referred to simply as initial waves) into a test piece through coupling medium, receiving echoes coming from the test piece and converting the echoes into electric signals; a receiving portion for amplifying the electric signals from the probe 3; a time-measuring portion for measuring a period of time between the emission of the initial wave and the reception of its echo from the test piece from the timing of emitting the transmission signal and that of receiving the output signal of the receiving portion 3 and converting the value of the period into that of the thickness of the test piece; and an indicating portion for output signals indicating the value of the evaluated thickness, respectively. Further, the ultrasonic distance meter is different from the ultrasonic thickness meter only in the respect that what the distance meter measures is not a thickness of a test piece but a distance between two positions in an air. A principle of measurement employed by the distance meter is substantially the same with that used in the case of the thickness meter.

As above stated, the conventional ultrasonic thickness meter has defects that the probe is to be directly in contact with the test piece and that the thickness meter is to be provided with a large-scaled mechanism in case of performing measurement in an automatic conveying line because of necessities of the coupling medium such as water and oil. On the other hand, the ultrasonic distance meter has drawbacks that its evaluated value of a distance is not stable because the sound speed and travelling distance of the ultrasonic wave propagated through an air vary with changes in temperature and pressure of the air and wind velocity and that thus the distance meter has to be equipped with a complicated compensating circuit in order to enhance its reliability. The present invention is accomplished to eliminate these drawbacks of the prior art.

It is therefore an object of the present invention to provide an improved ultrasonic dimension measuring apparatus which can measure a dimension or size of an object without using any coupling medium (that is, with its probes being kept to be out of touch with the surfaces of the test piece) and which also can be substantially free from influences of disturbances such as temperature of the air.

In accordance with an aspect of the present invention, an ultrasonic dimension measuring apparatus is provided with a pair of transmitting and receiving means spaced apart a predetermined distance from and being in opposing relation with each other, each being operable to transmit and receive ultrasonic signals and responsive to a transmission signal for transmitting ultrasonic pulses and for producing reception signals when receiving ultrasonic pulses, one of the pair of transmitting and receiving means being to face a top surface of an object of measurement and the other of the pair of transmitting and receiving means being to face a bottom surface of the object; control means for choosing a travelling period of time to be currently measured from a first, second and third travelling periods of time and for producing a first control signal indicating which one of the pair of transmitting and receiving means transmits ultrasonic pulses and which one of the pair of transmitting and receiving means receives the transmitted ultrasonic pulses when measuring the chosen travelling period of time, wherein the first travelling period of time is the time which the ultrasonic pulses take to propagate through the air between the pair of transmitting and receiving means, the second travelling period of time is the time which the ultrasonic pulses take to propagate through the air between the top surface of the object and one of the pair of transmitting and receiving means facing the top surface of the object, and the third travelling period of time is the time which the ultrasonic pulses take to propagate through the air between the bottom surface of the object and the other of the pair of transmitting and receiving means facing the bottom surface of the object; selection means responsive to the first control signal from the control means for sending transmission signals to the transmitting and receiving means indicated to transmit ultrasonic pulses and for receiving the reception signal from the transmitting and receiving means indicated to receive the transmitted ultrasonic pulses and for issuing the transmission and reception signals; and evaluation means for receiving the transmission and reception signals from the selection means and for measuring each of the first, second and third travelling periods of time from a time at which the indicated transmitting and receiving means transmitted an ultrasonic pulse and which is given by the transmission signal and another time at which the transmitting and receiving means received the transmitted ultrasonic pulse and which is given by the reception signal and for calculating the dimension of the object from the evaluated first, second and third travelling periods of time.

Namely, the ultrasonic dimension measuring apparatus of the present invention evaluates a dimension of thickness of the object from the travelling times of the top and bottom surface echoes measured immediately after the material object is inserted between the pair of transmitting and receiving means and the travelling time of the transmitted ultrasonic wave measured immediately before the object is inserted between the pair of transmitting and receiving means.

In accordance with another aspect of the present invention, the ultrasonic dimension apparatus is further provided with monitoring means for determining whether or not the object is present between the pair of transmitting and receiving means by detecting the ultrasonic wave propagated between the pair of transmitting and receiving means and for producing signals indicating that the object is present or absent between the pair of transmitting and receiving means, and the control means is responsive to the signals from the monitoring means to produce the first control signal.

That is, the ultrasonic dimension measuring apparatus determines whether or not the object is present between the pair of transmitting and receiving means by detecting the ultrasonic wave which propagated therebetween.

BRIEF DESCRIPTION OF THE DRAWINGS

Other objects and features of the present invention will be apparent to those skilled in the art on consideration of the following description taken in connection with the accompanying drawings wherein like parts in each of the several figures are designated by the same reference numeral and wherein:

FIG. 5 is a timing chart for illustrating an operation of the ultrasonic dimension measuring apparatus of FIG. 2;

FIG. 6 is a block diagram showing the selection and control portions of the ultrasonic dimension apparatus of FIG. 2;

FIG. 7 is a diagram showing relationship between status of switches in the control portion of the ultrasonic dimension measuring apparatus of FIG. 2;

DESCRIPTION OF THE PREFERRED EMBODIMENTS

Figure 1:
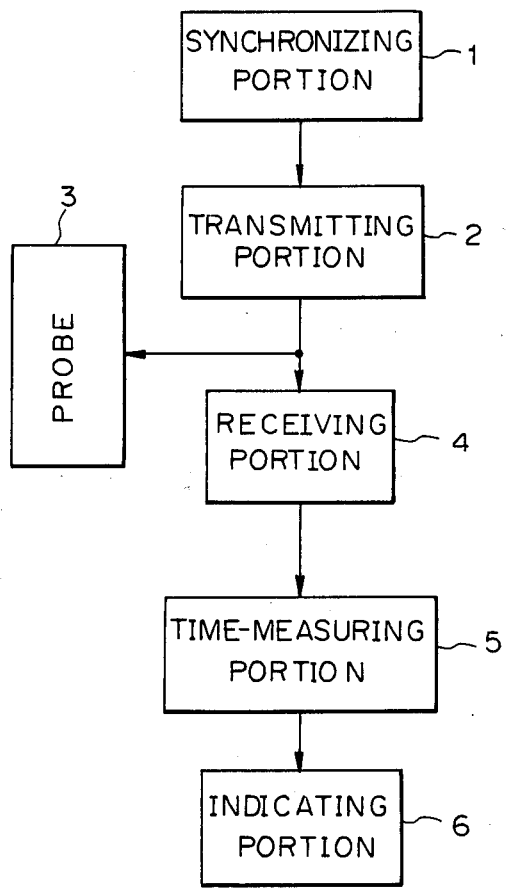
FIG. 1 is a block diagram of the prior art ultrasonic dimension measuring apparatus.
Figure 2:
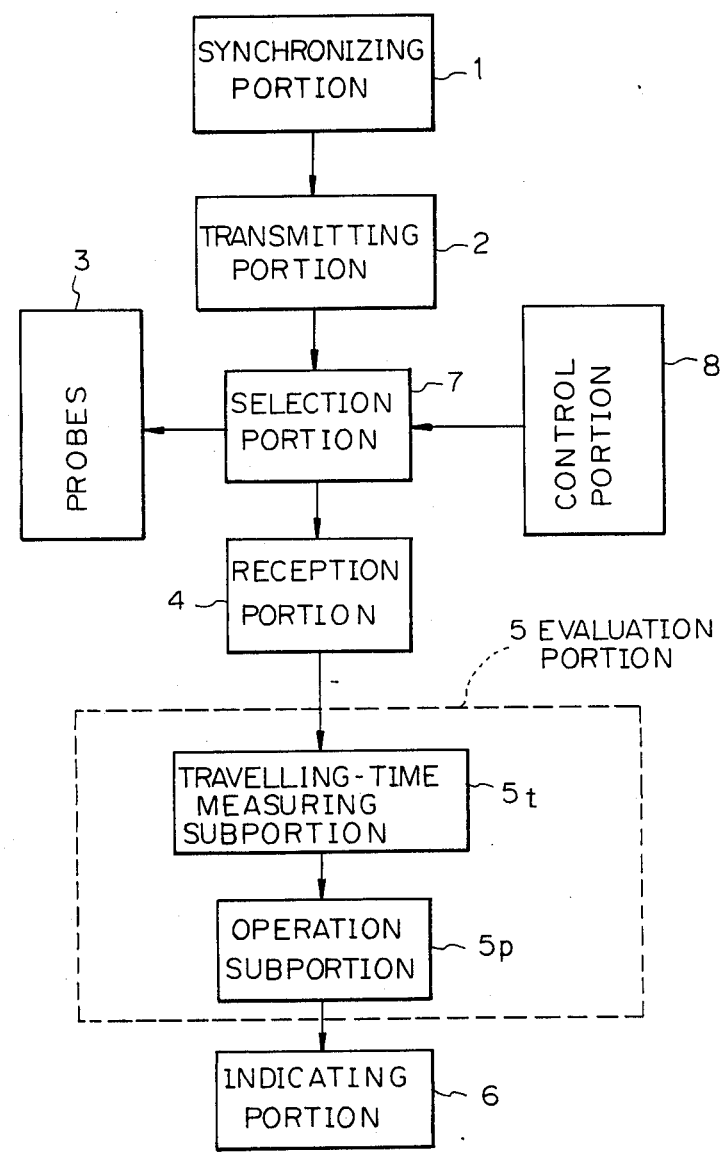
FIG. 2 is a block diagram of an ultrasonic dimension measuring apparatus embodying the present invention.

Referring now to the drawings, and in particular to FIG. 2, there is illustrated an ultrasonic dimension measuring apparatus embodying the present invention. As can be easily appreciated by referring to FIG. 1, this embodiment has like portions 1 to 4 and 6 as the prior art apparatus of FIG. 1 does but is different from the prior art apparatus in the respect that this embodiment further has an evaluation portion 5, a selection portion 7 and a control portion 8. The evaluation portion comprises: a subportion $5t$ for measuring travelling times of the ultrasonic wave transmitted through the space between the probes 3 and those of the echoes from the top and bottom surfaces of the object of measurement; and an operation subportion $5p$ for calculating a value of thickness of a test piece. The selection portion 7 is operative to selectively connect the transmitting portion 2 to a probe 3 indicated by the control portion 8 and also operative to receive the electric signal converted in a probe 3 indicated by the control portion 8 from the ultrasonic wave propagated therebetween and the echoes reflected from the top and bottom surfaces. The control portion 8 is for instance constructed by changeover switches and is operative to send out control signals each of which corresponds to different one of the travelling period of time of the ultrasonic wave propagated between probes 3 and the travelling periods of time of the top and bottom surface echoes to the selection portion 7.

Hereafter, an operation of the embodiment of FIG. 2 will be described, referring to FIGS. 2 to 5.

Figures 3, 4:
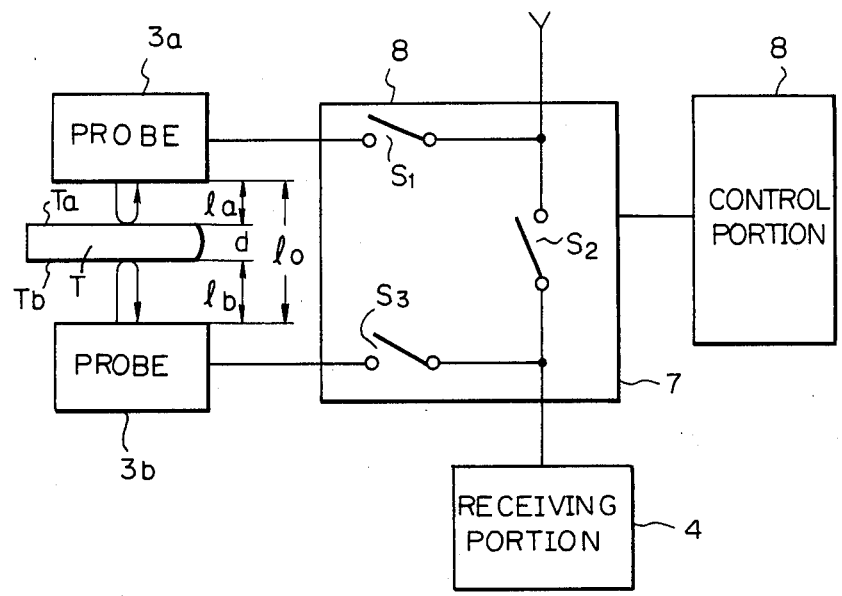
FIG. 3 is a schematic diagram showing connection between a selection portion and other portions of the apparatus according to the present invention.
FIG. 4 is a diagram showing relationship between status of switches in the selection portion of FIG. 2 and periods of time to be taken for measurement of different cases.

FIG. 3 is a circuit diagram for illustrating electrical connections between the selection portion 7 and other portions of the embodiment of FIG. 2.

Further, FIG. 4 is a diagram showing operative conditions of the switches in the selection portion 7 of FIG. 2.

Furthermore, FIG. 5 is a timing chart for illustrating the operation of the embodiment of FIG. 2.

First, during a period of time to be taken for measuring a travelling time of the ultrasonic wave propagated between the probes, that is, a period of time when no test piece is present between the two probes $3a$ and $3b$ positioned in such a manner to face each other in the air and are apart from each other by a prescribed distance as viewed in FIG. 3, the selection portion 7 is controlled such that switches $S_1$ and $S_3$ close and a switch $S_2$ opens (see CASE 1 in FIG. 4). As shown in FIG. 5($c$), in response to an output electric signal [shown in FIG. 5($b$)] of the transmitting portion 2 issued in synchronism with a output signal [shown in FIG. 5($a$)] of the synchronizing portion 1, an ultrasonic pulse is transmitted by the probe $3a$ and is propagated through the air. Thereafter, the ultrasonic pulse is received at the probe $3b$ [see FIG. 5($f$)]. The probe $3b$ then issues a corresponding signal which is transmitted to the receiving portion 4 by way of the closed switch $S_3$. The subportion $5t$ further receives the output of the receiving portion 4 and counts the number of reference clock pulses from a reference clock pulse generator (not shown) during a period between the timing at which the probe $3a$ transmits an ultrasonic pulse and the timing at which the probe $3b$ receives the transmitted ultrasonic pulse. Thus, the subportion $5t$ measures the travelling period of time of the wave propagated through the space between the probes $3a$ and $3b$.

Next, in case that a test piece is inserted between the probes $3a$ and $3b$, in a period of time for measuring the travelling period of time of the echoes from the test piece, a state of the dimension measuring apparatus is first put into a first phase of measuring a travelling period $t_a$ [see FIG. 5($d$)] of time of an echo from the top surface of the test piece and is further proceeded to a second phase of measuring a travelling peiod $t_b$ [see FIG. 5($h$)] of time of an echo from the bottom surface of the test piece after a predetermined period of time has passed since the first phase of measuring the top surface echo started. However, for simplicity of description, such a predetermined period of time is not shown in FIG. 5(h). As shown in FIGS. 5(e) and 5(g), the probe 3a is not used in the second phase and the probe 3b is not used in the first phase to transmit and receive ultrasonic pulses. Further, in each of the phases, a corresponding electric signal converted from the received echo in the probe is sent to the receiving portion 4.

When the switches $S_1$ and $S_2$ close and the switch $S_3$ opens (see CASE 2 in FIG. 4), the subportion 5t receives the output signal of the receiving portion 4 and the reference clock pulse and further measures the travelling time $t_a$ of the ultrasonic wave propagating through the media between the probe 3a facing the top surface Ta of the test piece and that surface Ta of the test piece.

On the other hand, when the switch $S_1$ opens and the switches $S_2$ and $S_3$ close (see CASE 3 in FIG. 4), the subportion 5t receives the reference clock pulses and the output signals of the receiving portion 4 and further measures the travelling time $t_b$ of the ultrasonic wave propagating through the air between the probe 3b facing the bottom surface of the test piece and the bottom surface Tb. The operation subportion 5p calculates a speed of the ultrasonic wave propagating through the air, the travelling distances of the echoes and the thickness of the test piece from the outputs of the subportion 5t.

Namely, the subportion 5p evaluates the following equations under the control of the signals from the control portion 8.

$$Va = l_o/t_o \quad (1)$$

Here, Va, $l_o$ and $t_o$ designate the speed of the ultrasonic wave propagating through the air, a mechanical distance between the probes 3a and 3b and the travelling period of the transmitted wave, respectively.

$$l_a = t_a \cdot Va/2 \quad (2)$$

In this equation, $l_a$ and $t_a$ indicate the travelling distance and time of the echo propagating from the top surface Ta of the test piece to the probe 3a, respectively.

$$l_b = t_b \cdot Va/2 \quad (3)$$

Here, $l_b$ and $t_b$ designate the travelling distance and time of the echo propagating through the bottom surface of the test piece, respectively.

Thus, a thickness d of the test piece is obtained by the following equations:

$$d = l_o - l_a - l_b = (2t_o - t_a - t_b)Va/2 \quad (4)$$

Furthermore, the control portion 8 for controlling the operation of the selection portion 7 comprises switches $S_{10}$, $S_{20}$ and $S_{30}$ as shown in FIG. 6. In this figure, each of $L_1$, $L_2$ and $L_3$ indicates a solenoid of a relay. An operator observes a waveform of the output signal of the receiving portion 4 displayed on a display apparatus such as a cathode-ray tube of the indicating portion 6 to determine whether or not a test piece is present between the probes 3a and 3b. In accordance with the determination, the operator manually opens or closes the switches $S_{10}$, $S_{20}$ and $S_{30}$ as described in FIG. 7 in order to establish the state of the switches $S_1$, $S_2$ and $S_3$ of the selection portion 7 as described in FIG. 4.

Incidentally, CASEs 1, 2 and 3 in FIG. 7 correspond to CASEs 1, 2 and 3 in FIG. 4, respectively.

Figure 8:
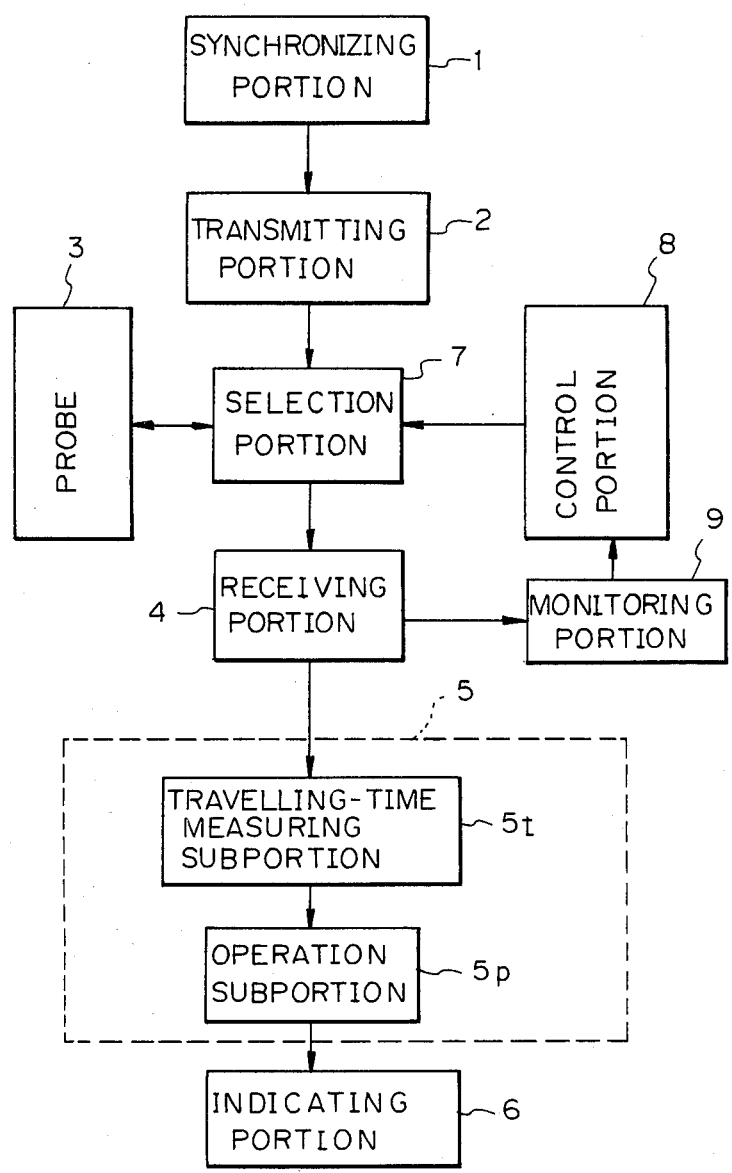
FIG. 8 is a block diagram of another ultrasonic dimension measuring apparatus embodying the present invention.
Figure 9:
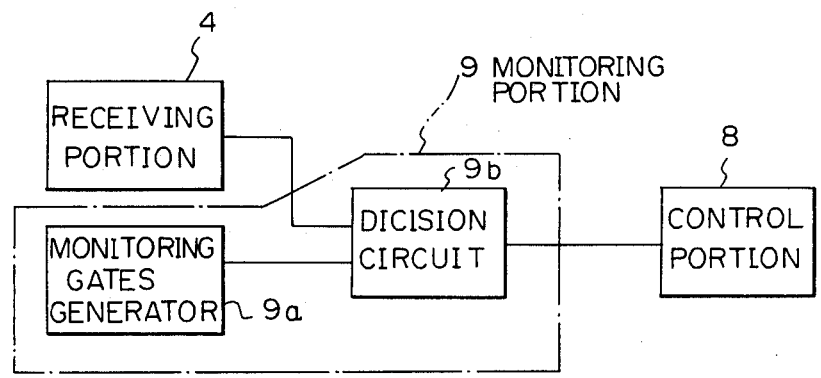
FIG. 9 is a schematic block diagram of the monitoring portion of the ultrasonic dimension measuring apparatus of FIG. 8.

FIG. 8 is a block diagram of an ultrasonic dimension measuring apparatus or another preferred embodiment of the present invention. In this figure, reference numeral 9 indicates a monitoring portion for monitoring the ultrasonic wave transmitted between the two probes and further issues to the control portion 8 signals indicating whether or not the transmitted wave exists therebetween. FIG. 9 is a block diagram of this monitoring portion 9. Further, FIG. 10 is a block diagram of the control portion 8 showing electrical connections therein.

Incidentally, FIG. 3 also shows connections between a selection portion 7 and other portions 3, 4 and 8 of the embodiment of FIG. 8. Moreover, FIG. 4 also shows operative conditions of switches in the selection portion 7 of this embodiment. Further, FIGS. 6 and 7 also shows the construction and operative conditions of the control portion of this embodiment.

Figure 10:
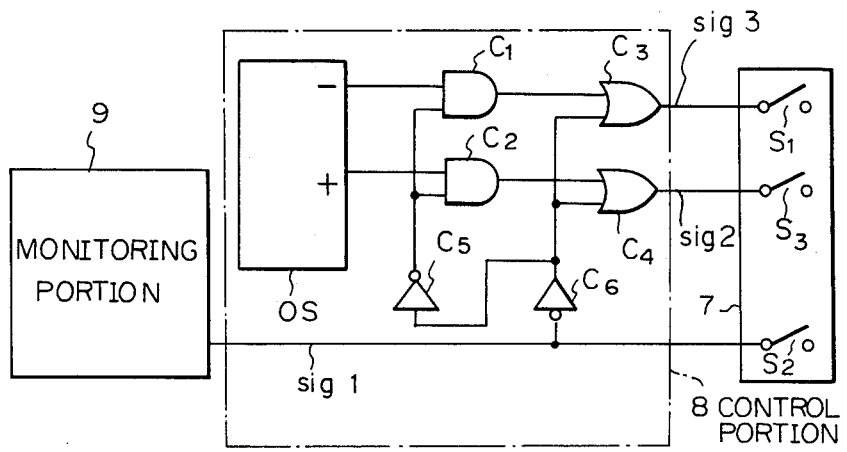
FIG. 10 is a block diagram of the control portion of the ultrasonic dimension measuring apparatus of FIG. 8.

In FIGS. 9 and 10, reference characters 9a, 9b and OS indicate a monitoring gate generating portion for generating gates for monitoring the transmitting waves, a decision circuit and an oscillator, respectively. Further, reference characters $C_1$ to $C_6$ indicate logic elements.

Hereinafter, an operation of this embodiment will be described.

First, in case that there is no test piece between the probes which are positioned in the air in such a manner to face each other and be apart from each other by a predetermined distance, that is, in CASE 1 shown in FIG. 4, the switches are controlled such that the switches $S_1$ and $S_3$ close and the switch $S_2$ opens. In this case, the ultrasonic wave transmitted by the probe 3a propagates through the air and is received by the probe 3b. An electric signal converted from the received wave by the probe 3b is sent out therefrom to the receiving portion 4. Concurrently with this, in the monitoring portion 9, the monitoring gate generating portion 9a establishes and generates monitoring gates such that each of the gates is a period of time corresponding to the mechanical distance $l_0$ between the probes 3a and 3b and the decision circuit 9b determines whether or not the transmitted wave is existing in the monitoring gate. If the transmitted wave is found in the monitoring gate, the decision circuit 9b sends the control portion 8 a signal indicating that the switch $S_2$ opens and thus the selection portion 7 maintains its conditions.

On the other hand, in case that a test piece is inserted or present between the probes 3a and 3b, the probe 3b receives no transmitted wave and therefore no transmitted wave appears within the monitoring gate. In this case, the monitoring portion 9 issues to the control portion 8 a signal indicating that the selection portion 7 changes its present conditions and the switch $S_2$ closes. When the switch $S_2$ closes, the output signals of the transmitting portion 2 are supplied to the probes 3a and 3b so that these probes become ready to radiate the ultrasonic wave into the air. In this period of time for measuring the travelling period of the echoes, it is shifted from the first phase of measuring the travelling period $t_a$ of the echo from the top surface of the test piece (in which, as shown in CASE 2 in FIG. 4, the switches $S_1$ and $S_2$ close and the switch $S_3$ opens) to the second phase of measuring the travelling period $t_b$ of the echo from the bottom surface of the test piece (in which, as shown in CASE 3 in FIG. 4, the switches $S_2$ and $S_3$ close and the switch $S_1$ opens) and in each of these phases, the corresponding electric signal converted from the echo is received by the corresponding probe and is sent to the receiving portion 4.

Next, referring now to FIGS. 11 and 12, an electric operation of this embodiment will be described hereinbelow.

First, when no test piece is mounted between the two probes 3a and 3b facing each other, an output signal from the receiving portion 4 is present within a monitoring gate generated in the monitoring portion. During this period of time, the output signal siq 1 of the monitoring portion 9 is "0V" (which voltage level will be designated by "L", hereunder) and makes the switch $S_2$ of the selection portion 7 remains open. Further, output signals siq 1 and siq 3 are "+5V" (which voltage level is hereunder designated by "H") and thus the switches $S_1$ and $S_2$ close.

On the other hand, when a test piece T is present between the probes 3a and 3b facing each other, there is no signal from the receiving portion 4 in the monitoring gate generated by the monitoring portion 9. During this period of time, the output signal siq 1 of the monitoring portion 9 is "H" and the switch $S_2$ in the selection portion 7 closes. Further, the logic circuit consists of the elements $C_1$ to $C_6$ operate the output voltage levels of the output signals siq 2 and siq 3 of the control portion 8 to alternate "H" and "L" according to output signals of the oscillator OS for producing signals each having a constant duration and thus the switches $S_2$ and $S_3$ of the selection portion 7 are alternately closed. The subportion 5t counts the reference clock pulses generated by the reference clock generator (not shown) which has been activated by a synchronizing signal issued by the synchronous portion 1 until the probe 3b receives the ultrasonic wave, and thus measures the travelling period $t_0$ of the ultrasonic wave transmitted between the probes 3a and 3b. When the switches $S_1$ and $S_2$ close and the switch $S_3$ opens, the subportion 5t receives the reference clock and the output signals of the receiving portion 4 and measures the travelling period $t_a$ of the ultrasonic wave propagating through the air between the top surface of the test piece and the probe 3a facing that top surface. Further, when the switch $S_1$ opens and the switches $S_2$ and $S_3$ close, the subportion 5t receives the reference clock and the output signals of the receiving portion 4 and measures the travelling period $t_b$ of the ultrasonic wave propagating through the air between the bottom surface of the test piece and the probe 3b facing that bottom surface. The operation portion 5p calculates the propagation speed of the ultrasonic wave, the travelling distance of the echoes and the value of the thickness of the test piece from the outputs of the subportions 5t.

The subportion 5p performs calculation of equations which are the same as the above described ones (1) to (4) with reference to the embodiment of FIG. 2.

Figure 11:
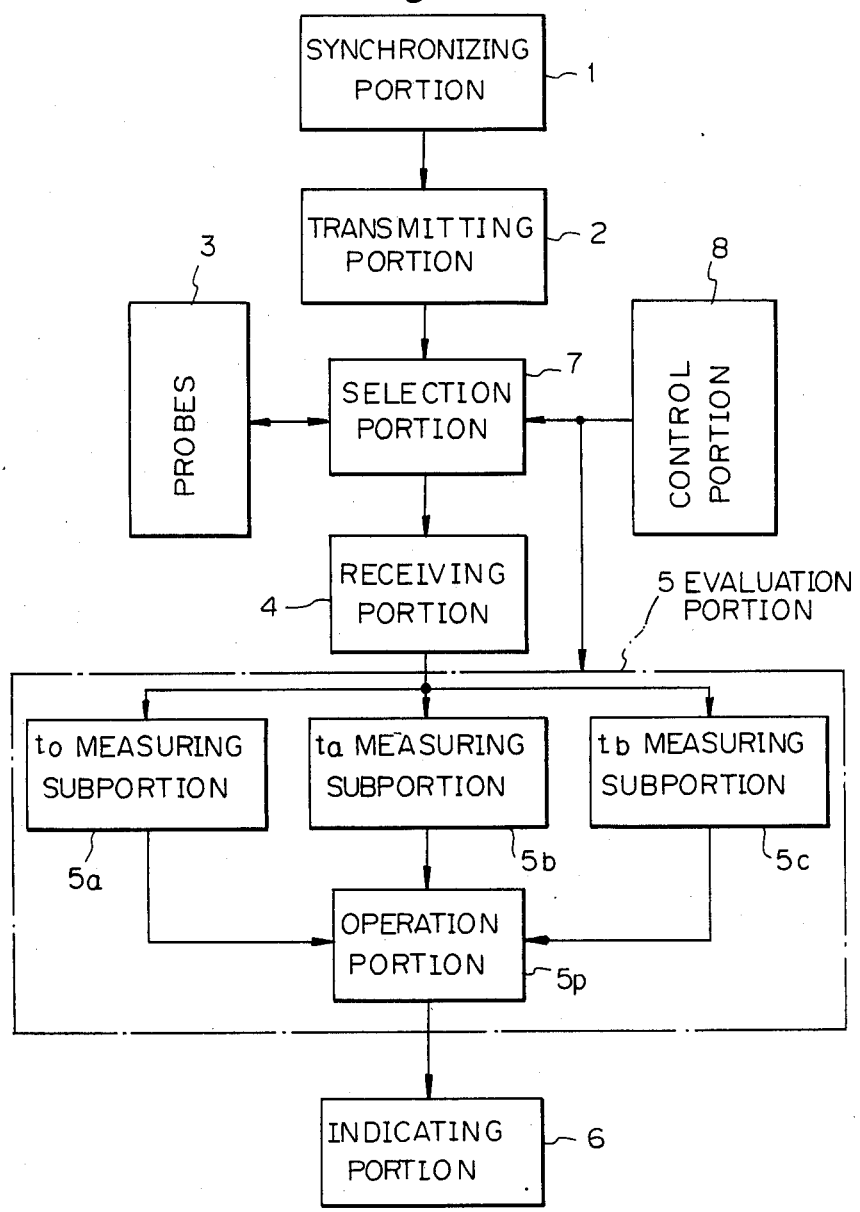
FIGS. 11 and 12 are block diagrams of other ultrasonic dimension measuring apparatus embodying the present invention.
Figure 12:
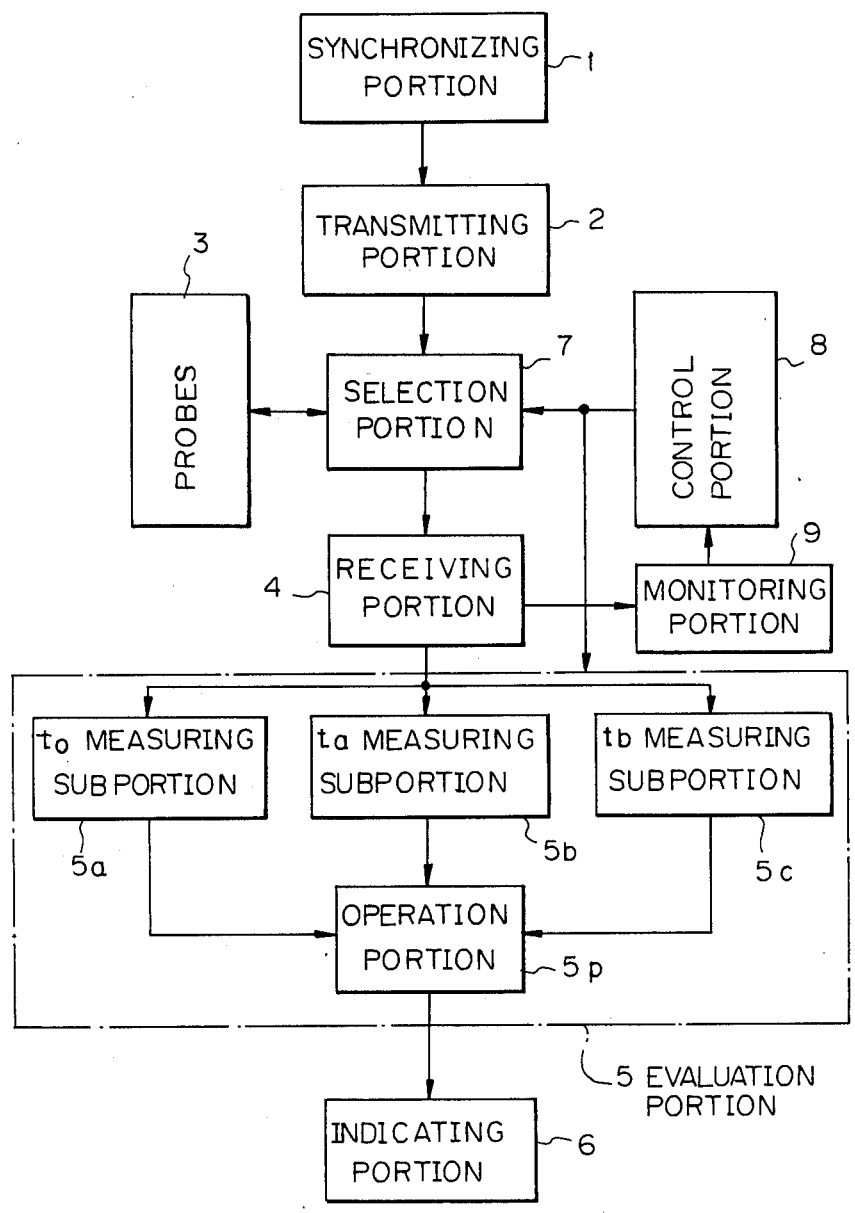

Other embodiments of the present invention are shown in FIGS. 11 and 12. In comparison of the embodiments of FIGS. 2 and 8, each of the evaluation portions of these embodiments has three subportions 5a, 5b and 5c which are respectively used for measuring the travelling times $t_0$, $t_a$ and $t_b$ in place of the subportion 5t of the embodiments of FIGS. 2 and 8. Namely, these embodiments are provided with the subportions 5a, 5b and 5c which are dedicated to quickly measure the travelling periods $t_0$, $t_a$ and $t_b$, respectively. The control portions 8 of the embodiments of FIGS. 11 and 12 switches these subportions 5a, 5b and 5c in accordance with the kind of the travelling time $t_0$, $t_a$ or $t_b$ is to be currently measured. These embodiments also can realize the above described object of the present invention. However, compared with the embodiments of FIGS. 2 and 8, these embodiment increase the amount of hardware required in the portin 5t for measuring travelling periods of time and need more complicated operations of the control portion 8 which further ought to control or switch over the three subportions 5a, 5b and 5c in accordance with the kind of travelling period of time to be measured.

As above stated, the ultrasonic dimension measuring apparatus according to the present invention can measure dimensions of the test piece such as thickness by taking advantage of the travelling period of the ultrasonic wave transmitted through the air between the probes with these probes being kept out of touch with the surfaces of the test piece. Therefore, the apparatus of the present invention is substantially free from any mechanical abrasion owing to contact with the surface of the test piece and thus can be used semipermanently. Further, this technical advantage can be obtained independently of kinds of materials of the test pieces because the ultrasonic wave does not propagate in the test pieces. Moreover, the apparatus of the present invention is not in need of correction of any error due to disturbances such as change in temperature of the air. Furthermore, the present invention can save installing devices such as a photodetector near the probes in the ultrasonic thickness meter to detect an object of measurement because the presence of the test piece is verified by detecting the ultrasonic wave transmitted through the air between the probes.

While the preferred embodiments have been described, it is to be understood that modifications will be apparent to those skilled in the art without departing from the spirit of the invention. The scope of the invention is therefore to be determined solely by the appended claims.

What is claimed is:

1. An apparatus for measuring a dimension of an object by using ultrasonic waves, said apparatus comprising:

a pair of transmitting and receiving means spaced apart a predetermined distance from and being in opposing relation with each other, each being operable to transmit and receive ultrasonic signals and responsive to a transmission signal for transmitting ultrasonic pulses and for producing reception signals when receiving ultrasonic pulses, one of said pair of transmitting and receiving means facing a top surface of the object and the other of said pair of transmitting and receiving means facing a bottom surface of the object;

control means for choosing a travelling period of time to be currently measured from a first, second and third travelling periods of time and for producing a first control signal indicating which one of said pair of transmitting and receiving means transmits ultrasonic pulses and which at one of said pair of transmitting and receiving means receives the transmitted ultrasonic pulses when measuring the chosen travelling period of time, said first travelling period of time being the time which the ultrasonic pulses take to propagate through the air between said pair of transmitting and receiving means, said second travelling period of time being the time which the ultrasonic pulses take to propagate through the air between the top surface of the object and one of said pair of transmitting and receiving means facing the top surface of the object, said third travelling period of time being the time which the ultrasonic pulses take to propagate through the air between the bottom surface of the object and the other of said pair of transmitting and receiving means facing the bottom surface of the object;

selection means responsive to the first control signal from said control means for sending transmission signals to said transmitting and receiving means indicated to transmit ultrasonic pulses and for receiving the reception signal from said transmitting and receiving means indicated to receive the transmitted ultrasonic pulses and for issuing the transmission and reception signals; and evaluation means for receiving the transmission and reception signals from said selection means and for measuring each of the first, second and third travelling periods of time from a time at which said indicated transmitting and receiving means transmitted an ultrasonic pulse and which is given by the transmission signal and another time at which said indicated transmitting and receiving means received the transmitted ultrasonic pulse and which is given by the reception signal and for calculating the dimension of the object from the evaluated first, second and third travelling periods of time; and monitoring means for determining whether or not the object is present between said pair of transmitting and receiving means by detecting the ultrasonic wave propagated between said pair of transmitting and receiving means and for producing signals indicating that the object is present or absent between said pair of transmitting and receiving means to said control means, in which;

said control means being responsive to the signals from said monitoring means to produce the first control signal.

2. The apparatus set forth in claim 1 wherein said evaluation means includes:

means for measuring the three kinds of travelling periods of time; and means for calculating the dimension of the object from the measured values of the first, second and third travelling periods of time.

3. The apparatus set forth in claim 2 wherein said means for measuring the three kinds of travelling period of time comprises:

first means for measuring the first travelling period of time;

second means for measuring the second travelling period of time; and third means for measuring the third travelling period of time, and wherein, said control means producing a second control signal which indicates that one of said first, second and third means being to be connected to said selection means in accordance with the chosen kind of travelling period of time and wherein, said means for measuring first, second and third travelling periods of time is further responsive to the second control signal from the control means to connect said selection means to one of said first, second and third means to receive the transmission and reception signal.

4. The apparatus set forth in claim 1 wherein said monitoring means includes:

means for generating monitoring gates each of which corresponding to a mechanical distance between said pairs of transmitting and receiving means; and means for receiving the reception signal and for deciding whether or not the object is present between said pair of transmitting and receiving means by detecting the reception signal in the monitoring gate.

5. The apparatus set forth in claim 1 wherein said control means receives the output signal of said monitoring means and sends out third, fourth or fifth control signal as a first control signal to said selection means and wherein said control means issues the received output signal of said monitoring means as the third control signal indicating one of said pair of transmitting and receiving means being to transmit ultrasonic pulses and also indicating the other of said pair of transmitting and receiving means being to receive the transmitted ultrasonic pulses to measure the travelling period of time of the ultrasonic pulses propagating between said pair of transmitting and receiving means when the received output signal of said monitoring means is in a prescribed state, said control means issuing the fourth and fifth control signals when the received output signal of said monitoring means is in a prescribed another state, the fourth and fifth control signals respectively indicating said transmitting and receiving means facing the top and bottom surfaces to measure the travelling periods of time of top and bottom surface echoes.

6. The apparatus set forth in claim 5 wherein said control means includes:

first logic means ($C_6$) for receiving the output signal from said monitoring means and for inverting the received signal at an output thereof;

oscillating means (OS) for producing positive and negative oscillating output signals of a constant duration;

second logic means ($C_5$) for taking the output signal of said first logic means thereinto and for inverting the output signal of said first logic means at an output thereof;

third logic means ($C_1$) for receiving both the negative output signal of said oscillating means and the output signal of said second logic means and for energizing an output thereof only when each of the signals received form said oscillating means and from said second logic means is in a prescribed state;

fourth logic means ($C_2$) for receiving both the positive output signal of said oscillating means and the output signal of said second logic means and for energizing an output thereof only when each of the signals from said oscillating means and from said second logic means is in a prescribed state;

fifth logic means ($C_3$) for receiving both the output signals of said first and third logic means and for producing an output signal when any one or more of the signals received from said first and third logic means is in a prescribed state; and sixth logic means ($C_4$) for receiving the output signals of both said first and fourth logic means and for producing an output signal when any one or more of the signals received from said first and fourth logic means is in a prescribed state.

7. The apparatus set forth in claim 6 wherein said control means issues the output signals of the fifth and sixth logic means as the second and third control signals, respectively.

8. The apparatus set forth in claim 6 wherein said control means issues the output signals of said fifth and sixth logic means as the third or second control signals.

9. An apparatus for measuring a dimension of an object by using ultrasonic waves, said apparatus comprising:
- transmitter means,
- receiver means,
- a pair of transceiver means spaced apart a predetermined distance and disposed in opposed relation to each other so as to face opposite surfaces of said object, each said transceiver means being operable to transmit and receive ultrasonic signals,
- selection means intercoupling said transmitter means, receiver means and pair of transceiver means for controlling the ultrasonic signals coupled therebetween,
- said selection means including means for establishing first, second and third nodes of operation defining respective first, second and third ultrasonic signal travelling periods, said first travelling period representing the transmit time of the ultrasonic signal through air between said pair of transceiver means, said second travelling period representing the time which the ultrasonic signal takes to propagate through air between the top surface of the object and the one of said transceiver means facing the object top surface, said third travelling period representing the time which the ultrasonic signal takes to propagate through air between the bottom surface of the object and the other one of said transceiver means facing the object bottom surface;
- control means coupled to said selection means and producing a control signal indicating which one of said modes is chosen;
- evaluation means coupled from said selection means and for measuring each of said first, second and third traveling periods and for calculating the dimensions of the object from the evaluated first, second and third travelling periods; and
- monitoring means for determining whether or not the object is present between said pair of transceiver means by detecting the ultrasonic wave propagated between said pair of transceiver means and for producing signals indicating that the object is present or absent between said pair of transceiver to said control means, in which said control means is responsive to the signals from said monitoring means to produce said control signal.

10. The apparatus as set forth in claim 9 wherein said evaluation means includes means for measuring the three kinds of travelling periods of time, and means for calculating the dimension of the object from the measured values of the three kinds of travelling periods of time.

11. The apparatus as set forth in claim 9 wherein said monitoring means includes means for generating monitoring gates each of which corresponds to a mechanical distance between said pair of transceiver means, and means for receiving the reception signal and deciding whether or not the object is present between said pair of transceiver means by detecting the reception signal in the monitoring gate.

12. The apparatus set forth in claim 9 wherein said selection means includes connecting means responsive to the control signal from said control means for connecting a source of the transmission signals to said transceiver means directed to transmit ultrasonic pulses.

13. The apparatus set forth in claim 12 wherein said connecting means includes a first switching means for making and breaking connection between said source of the transmission signals of one of said pair of transceiver means, and a second switching means for making and breaking connection between said source of the transmission signals and the other of said pair of transceiver means and wherein said control means activating or inactivating said first and second switching means to change said transceiver means is directed by the control signal from said control means to transmit ultrasonic pulses.

14. The apparatus set forth in claim 12 wherein each of said first and second switching means comprises a relay.

* * * * *